Figure 1:
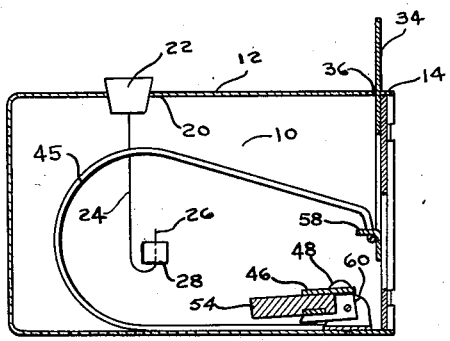

Feb. 1, 1949.    R. F. GOOSTREY    2,460,417
MOUSE TRAP
Filed Jan. 17, 1946

Inventor
ROBERT F. GOOSTREY
By Beaman & Langford
Attorneys

Patented Feb. 1, 1949

2,460,417

UNITED STATES PATENT OFFICE 2,460,417

MOUSETRAP

Robert F. Goostrey, Jackson, Mich.

Application January 17, 1946, Serial No. 641,779

7 Claims. (Cl. 43—61)

The present invention relates to the improvement in animal traps being especially adapted for use as a mouse trap because of the ease with which the trapped animal may be removed and the trap reset.

Accordingly, one of the objects of the invention is to provide an improved mouse trap or the like, characterized by its ease of reset and removal of the trapped animal.

Another object is to provide an animal trap in which the trap may be opened and reset all with a simple manipulation of the wrist and thumb without touching the animal or the trigger mechanism.

A further object is to provide an improved trigger and jaw arrangement which is exceptionally sensitive and inexpensively manufactured.

A further object of the invention is to provide a mouse trap consisting of a housing having a wall with an opening therein and a movable jaw in the form of a plate having a portion projecting through the housing adapted to be depressed to reset the trap.

These and other objects and advantages residing in the combination, arrangement and construction of parts will be more fully appreciated from a consideration of the detailed specification to follow and the appended claims.

Figure 2:
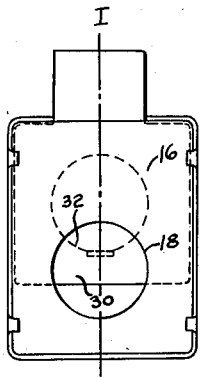
Figure 3:
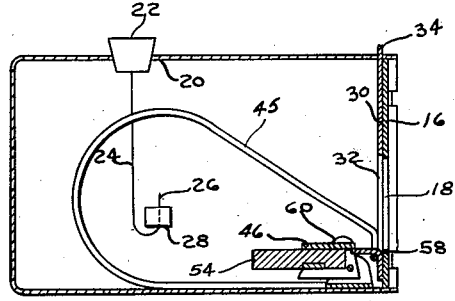
Figure 4:
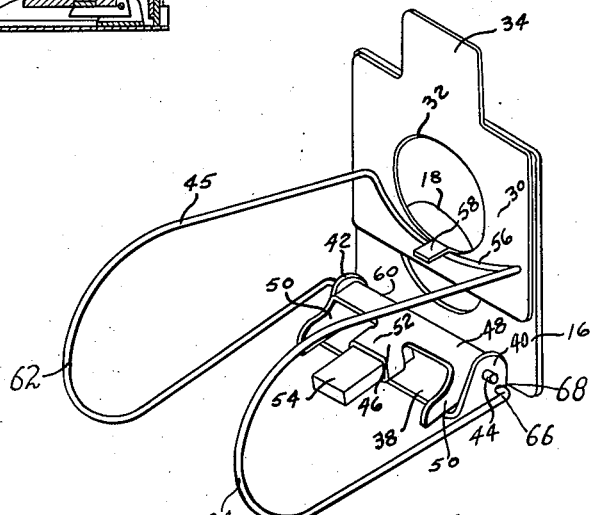

In the drawings,

Fig. 1 is a side elevational view of a vertical section taken on line I—I of Fig. 2, Fig. 2 is an end view of the construction shown in Fig. 1, Fig. 3 is a view similar to Fig. 1 showing the trap set, and Fig. 4 is a perspective view of the end wall jaw plate spring and trigger assembly.

Referring to the drawing, the trap 10 preferably comprises the sheet metal casing 12 closed on all sides except the end 14 which is closed by a separately fabricated metal plate 16. A hole 18 is provided in plate 16 through which the animal may enter when the trap is set. If desired, a hole 20 may be provided to receive a cork or the like carrying a wire 24 provided with a hook 26 to receive suitable bait 28. To re-bait, the cork 22 is withdrawn from the opening 20.

The moving jaw of the trap 10 is preferably in the form of a sheet metal plate 30 having an opening 32 corresponding to the opening 18 and adapted to align therewith when the trap is set as shown in Fig. 3. The plate 30 is vertically slidable along the rear face of the plate 16. When the trap is sprung, a re-setting tab 34 is projected upwardly as shown in Fig. 1 to where it may be conveniently engaged by the thumb with the casing 12 held in the palm of the hand in the case of a mouse trap or the like. A slot 36 in the casing 12 is provided to accommodate tab 34 to assist in guiding the plate 20.

As more clearly shown in Fig. 4, the plate 16 has a turned-back portion 38 with turned-up ears 40 and 42 provided with openings to receive a shaft portion 44 of the spring 45. Supported on the shaft 44 for free pivotal movement is the trigger 46 comprising a flat portion 48 having turned-down ears 50 apertured to receive the shaft 44. An extension 52 is wrapped upon the overhang 54. If desired, the latter may be of porous material impregnated with a suitable substance having attraction to the animal being trapped.

The cross-over portion 56 of the spring 45 is located beneath the ledge or shoulder 58 on the plate 30 which places the spring 45 under tension in all positions of the plate 30. To set the trap, the inturned ledge 58 is lowered into the position shown in Fig. 3, being moved along a vertical path passing substantially through the axis of the shaft 44. With the trigger 46 in the tilted position shown in Fig. 1 into which it is moved by gravity, the ledge 58 will clear the latch portion 60 of the flat portion 48. If the thumb tab 34 is then fully depressed and the trigger 46 is lifted into the position shown in Fig. 3, the ledge 58 engages beneath the latch portion 60 thus constituting a releasable latch connection between the trigger 46 and the movable plate 30. For the reason that such engagement takes place along a vertical plane through or substantially through the shaft 44, the trigger 46 will hold the plate 30 in the set position shown in Fig. 3, with the spring 45 fully tensioned. The movement of the trigger 46 to set the trap may be accomplished by inverting the casing 12 with the tab 34 depressed and then releasing the same slightly. Another method is to impart a sudden flip to the casing 12 at the time the tab 34 is depressed which will accomplish the same result. Also, the same motion given to the casing 12 to eject a mouse in the trap will function to lift the trigger 46 to a point where it may be engaged by a ledge 58 to reset the trap. The plate 30 is guided for vertical movement by the sides of the casing 12 and the slot 36 acting in conjunction with the locating action of the cross member 56 of the spring 45 which urges the plate 30 towards the fixed plate 16.

As shown, the shaft 44 is an integral part of the spring 45. The cross over portion 56 of the spring 44 connects the open looped portions 62 and 64 which are normally stressed into the position shown in Fig. 3 and when the trap is set it has an inherent tendency to hold the portion 56 upwardly into the position shown in Fig. 1. If the shaft 44 is considered one end of the spring 45, the opposite end of the spring 45 may be indicated at 66 as turned inwardly and received in the hole 68 in the ear 40. With this arrangement a single continuous piece of spring wire serves the function of a shaft of the trigger as well as the biasing means for the relatively movable plates between which the animal is trapped.

Having thus described my invention, what I claim as new and desire to protect by Letters Patent is:

1. A mouse trap or the like, comprising a housing having an opening in one end thereof, a fixed plate member closing said opening and having a hole therein, a movable plate slidably positioned along the inside of said first plate and vertically movable between upper sprung position and a lower set position and having a hole therein registering with said first hole with said movable plate in its lower set position, means guiding said movable plate for movement relative to said first plate, spring means acting on said movable plate to project the same into the upper sprung position, a part on said movable plate extending above said housing with said movable plate in the upward sprung position and adapted to be depressed to move said movable plate into the lower set position, a trigger located within said housing, and means constituting a releasable connection between said movable plate and said trigger to hold said movable plate in the lower set position.

2. A mouse trap or the like, comprising a housing having an opening in one end, a plate closing said opening and having a hole therein, a second plate slidably mounted along the inside of said first plate and vertically movable between upper sprung position and a lower set position and having a similar hole therein registering with said first hole with said movable plate in its lower set position, means guiding said movable plate for movement relative to said first plate, spring means acting upon said movable plate to project the same to the upper sprung position, a part on said movable plate and projecting to the outside of said housing and adapted to move said movable plate from the upper sprung position to the lower set position, a trigger located within said housing, and means constituting a releasable connection between said movable plate and said trigger to hold said movable plate in the lower set position.

3. In a trap, a jaw and trigger assembly comprising a fixed plate, a movable plate engaging with one side of said fixed plate and adapted to slide in contact therewith between upper sprung position and a lower set position, spring means engaging with said movable plate, said plates having holes defined therein adapted to be aligned in the lower set position, means guiding said movable plate for movement relative to said first plate, a trigger base formed along the edge of said fixed plate, a trigger supported on said base for movement, a releasable latch connection between said trigger and said movable plate to hold said movable plate in the set position with said holes aligned and a projection on said trigger adapted to be rocked by an animal passing thereover for breaking said latch connection to release said movable plate to the action of said spring.

4. A mouse trap comprising a pair of jaws in the form of juxtaposed plates, one of said plates being movable relative to the other from a lower set position to an upper sprung position, a pair of spaced bearings integral with one of said plates, a resilient wire spring connected to one of said plates continuously acting to urge to movement of one relative to the other, aligned openings in said plates with said plates in the set position, an extension of said spring extending between said bearings to constitute a shaft, a trigger pivoted upon said shaft, and means constituting a releasable operative connection between said trigger and said movable plate, said connection being broken upon pivotal movement of said trigger to spring said trap.

5. In a mouse trap or the like, a jaw and trigger assembly comprising a pair of plates, one of which is fixed and the other movable relative thereto between upper sprung position and a lower set position, said plates having holes defined therein and aligned in the set position, an inturned flange at the lower edge of the fixed plate, said flange having upturned ears to receive a shaft, means guiding said movable plate for movement relative to said first plate, a wire spring formed as two open end loops spaced in parallel relation and having transverse portions, one of said portions extending between said upturned ears to constitute a shaft, the other of said portions being disposed along the back side of said movable plate, a shoulder upon said movable plate with which said other transverse portion of said spring engages, a trigger to be actuated by the animal mounted upon the shaft portion of said spring, and means constituting an operative releasable connection between said movable plate and said trigger, for holding said movable plate in the set position against the tension of said spring.

6. A mouse trap comprising a pair of plates in juxtaposition, in which one is fixed and the other is slidable along a face of said fixed plate between upper sprung position and a lower set position, said plates having openings defined therein aligned in the set position, a wire spring in the form of two spaced, open end loops connected by a cross portion, said cross portion bearing against said slidable plate to hold it adjacent said fixed plate, means constituting an operative releasable connection between said cross portion and said slidable plate to bias the latter to the sprung position, and a trigger mechanism for latching said slidable plate in the set position.

7. A mouse trap comprising a pair of plates in juxtaposition, in which one is fixed and the other is slidable along a face of said fixed plate between upper sprung position and a lower set position, said plates having openings defined therein and aligned in the set position, a wire spring in the form of two spaced, open end loops connected by a cross portion, said cross portion bearing against said slidable plate to hold it adjacent said fixed plate, a flange at the bottom of said fixed plate having spaced upright ear portions, a shaft extending between said ear portions, and a trigger mechanism supported upon said shaft for latching said slidable plate in the set position.

ROBERT F. GOOSTREY.

REFERENCES CITED

The following references are of record in the file of this patent:

UNITED STATES PATENTS

| Number | Name | Date |
|---|---|---|
| 1,176,815 | Cowan | Mar. 28, 1916 |
| 1,222,406 | Jakab | Apr. 10, 1917 |